A. NOWKA.
MOTOR TRACTOR.
APPLICATION FILED OCT. 7, 1916.
1,211,216.
Patented Jan. 2, 1917.
2 SHEETS—SHEET 1.
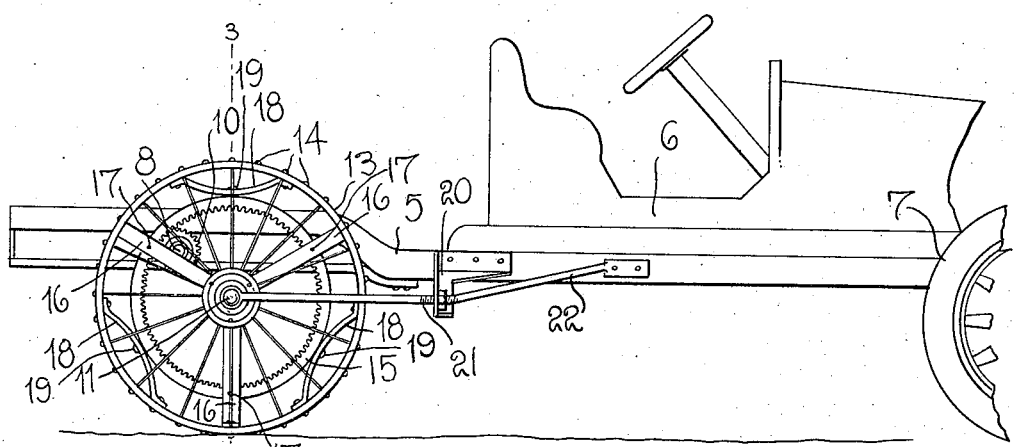
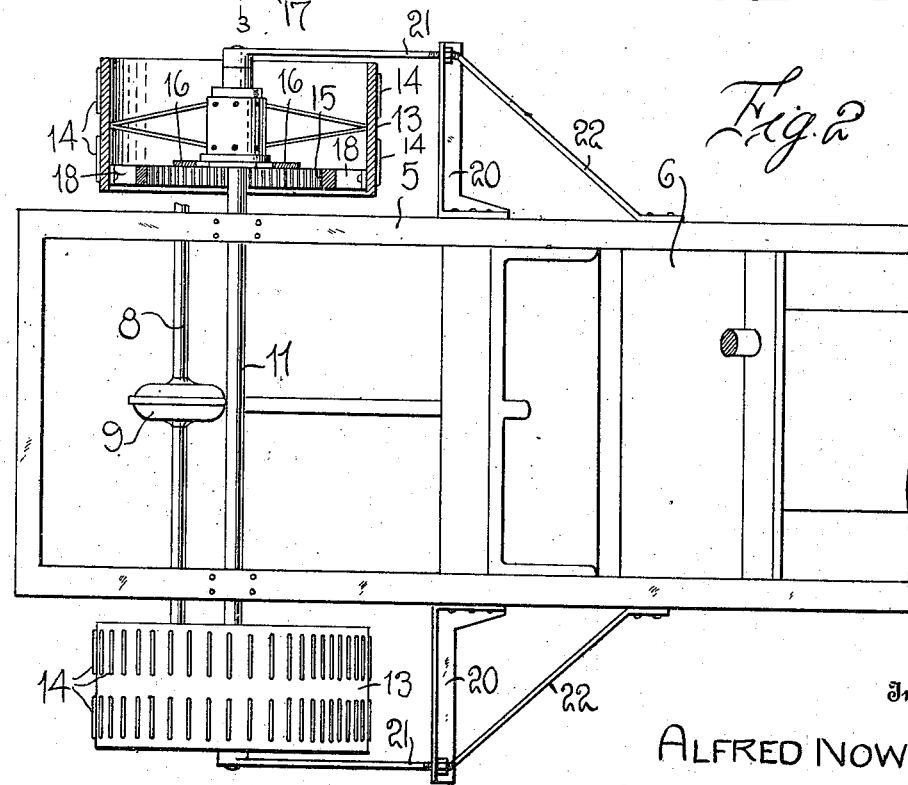
Inventor
ALFRED NOWKA
By Watson E. Coleman
Attorney A. NOWKA.
MOTOR TRACTOR.
APPLICATION FILED OCT. 7, 1916.
1,211,216.
Patented Jan. 2, 1917.
2 SHEETS—SHEET 2.
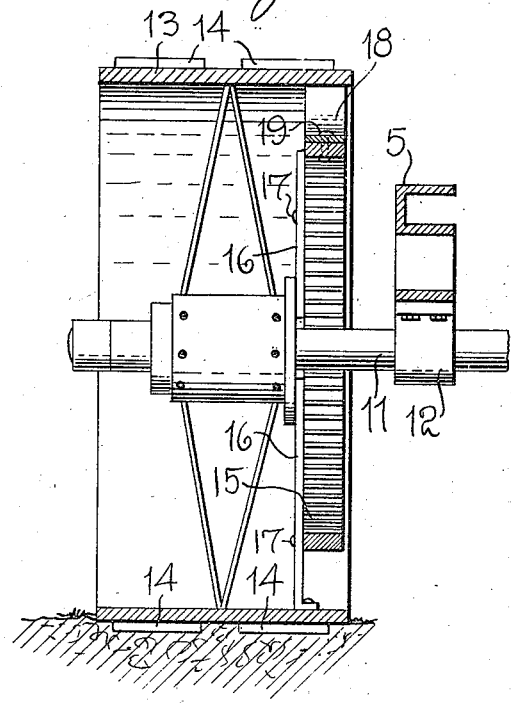
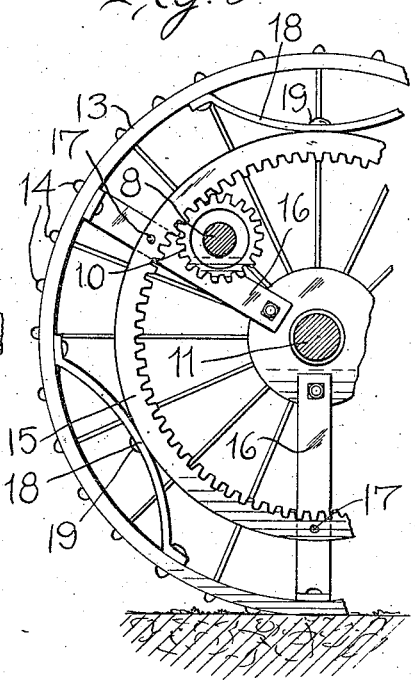
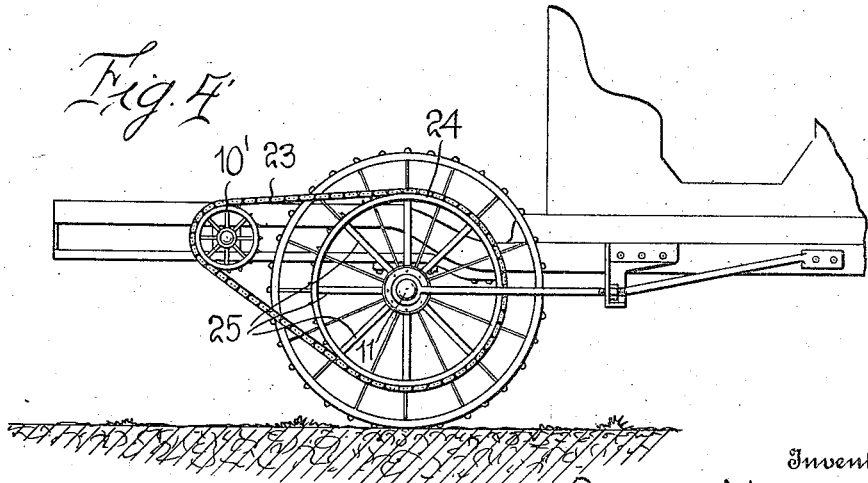
Inventor
ALFRED NOWKA
By Watson E. Coleman
Attorney

UNITED STATES PATENT OFFICE.

ALFRED NOWKA, OF HARVARD, NEBRASKA.

MOTOR-TRACTOR.

1,211,216.   Specification of Letters Patent.   Patented Jan. 2, 1917.

Application filed October 7, 1916. Serial No. 124,388.

*To all whom it may concern:*

Be it known that I, ALFRED NOWKA, a citizen of the United States, residing at Harvard, in the county of Clay and State of Nebraska, have invented certain new and useful Improvements in Motor-Tractors, of which the following is a specification, reference being had to the accompanying drawings.

This invention relates to motor tractors and has for its primary object to provide improved means for converting the ordinary motor driven vehicle into a farm tractor.

It is a more particular object of the invention to provide mechanism for the above purpose, which consists in the substitution of power transmission means on the rear axle of the vehicle in place of the usual drive wheels, a shaft mounted upon the vehicle frame in advance of the driving axle, and tractor wheels revolubly mounted upon the ends of said shaft and having an operative driving connection with the transmission means on the differential axle.

It is another important object of the invention to provide internal gears and means for mounting the same upon the tractor wheels and rigidly bracing said internal gears.

It is also one of the specific objects of the invention to provide improved bracing means between the ends of the supplementary shaft upon which the tractor wheels are mounted and the chassis or frame of the motor vehicle.

It is a further general object of the invention to provide means for converting the motor vehicle into a farm tractor which is exceedingly simple, may be easily and quickly applied to the ordinary motor vehicle without necessitating the employment of a skilled mechanic, and is highly convenient and serviceable in practical use.

With the above and other objects in view, my invention consists in the novel features of construction, combination and arrangement of parts to be hereinafter more fully described, claimed and illustrated in the accompanying drawing, in which, Figure 1 is a side elevation of a motor vehicle converted into a farm tractor by means of the present invention, the tractor wheels being gear driven; Fig. 2 is a top plan view, one of the wheels being partly broken away; Fig. 3 is a vertical section taken on the line 3—3 of Fig. 1; Fig. 4 is a side elevation showing a chain drive for the tractor wheels; and Fig. 5 is an enlarged fragmentary elevation of the internally geared tractor wheel.

Referring in detail to the accompanying drawings and more particularly to Figs. 1, 2 and 3 thereof, 5 designates the frame or chassis of the ordinary motor vehicle upon which the body 6 of any preferred construction is suitably mounted and secured. 7 designates the front supporting wheels of the vehicle which are mounted for turning or steering movement in the usual manner.

The rear axle 8 of the vehicle is driven through the differential gearing indicated at 9, and in the application of the present invention the drive wheels are removed from the ends of the axle 8 and spur gears 10 substituted therefor, said gears being keyed or otherwise rigidly fixed to the ends of the axle.

In advance of the rear axle 8 and the differential gearing in parallel relation thereto, a supplementary shaft or axle 11 is rotatably mounted in suitable bearings indicated at 12, which are fixed to the longitudinal side bars of the frame or chassis 5. Upon the opposite ends of this supplementary axle, the tractor wheels 13 are securely fixed, said wheels being provided with the peripheral, diagonally disposed, ground engaging cleats 14, as is usual in this type of wheel. Each of these tractor wheels is equipped with an internally toothed, annular gear 15.

16 designates a plurality of radially disposed bars which are securely fixed at their inner ends to the wheel hub and extend across the outer face of the annular gear 15 and are riveted or securely bolted thereto, as at 17. The outer ends of said bars are securely bolted or riveted to the wheel 13. As an additional means for rigidly mounting or bracing the internal gear, the longitudinally curved bars 18 are arranged between the radial bars 16, said additional brace bars being disposed between the annular gear 15 and the inner face of the wheel 13. The intermediate portions of said bars are riveted or bolted, as indicated at 19, to the gear and have their extremities similarly secured to the wheel 13. The spur gears 10 on the ends of the axle 8 have meshing engagement with the respective internal gears 15 carried by the traction wheels, and transmit a driving force to said wheels.

In order to securely brace the supplementary shaft or axle 11, an outwardly extending angle bar 20 is securely bolted at its inner end to each of the longitudinal side bars of the frame 5. One end of a heavy rod 21 is fixed to the outer extremity of each angle bar 20 and the rear end thereof connected to one end of the axle 11. Obliquely disposed, inwardly extending brace rods 22 are also bolted to the outer ends of the angle bars 20 and extend forwardly therefrom and are securely bolted to the frame 5, as clearly shown in Fig. 2 of the drawings. In this manner, it will be seen that the axle 11 is securely braced and supported and excessive strain upon the bearings 12 relieved in the tractive engagement of the wheels 13 with the ground surface. The gear driven tractor above described is admirably adapted for the hardest kind of service encountered in ordinary farm work. It will be seen that in the application of the invention to the motor vehicle, no alterations whatever are required in the construction of the latter nor is it necessary to obtain the services of a skilled mechanician in order to apply the invention.

In Fig. 4 of the drawings, I have illustrated a chain driven tractor wherein the sprocket wheels 10′ are applied to the ends of the driven axle 8 and operatively connected by the endless chains 23 to the sprocket wheels 24 which are mounted upon the ends of the supplementary axle 11 and securely bolted to the hubs of the traction wheels. In the use of the sprocket wheels, the bracing means as employed in connection with the internal gears above referred to, is dispensed with, each of the sprocket wheels being preferably formed with a plurality of radially extending, inwardly inclined spokes or braces 25. The supplementary axle 11, however, is braced from the frame 5 in the manner above described.

It will be seen that by mounting the supplementary axle in advance of the driven axle 8 of the motor vehicle, I have eliminated the necessity of using an extension frame which enables the machine to be operated with greater convenience and facility in turning corners or avoiding obstructions and also results in maintaining a proper balance of the machine. By arranging the traction wheels nearer the center of the machine, it is unnecessary to place additional weights upon the rear end of the machine. It will, therefore, be appreciated that in a very simple construction, I have succeeded in converting the ordinary motor vehicle into a farm tractor which may be satisfactorily employed for all traction purposes.

While I have herein shown and described the preferred construction and arrangement of the several elements employed, it will, of course, be understood that I do not desire to be limited thereto as the invention is susceptible of many minor modifications and I, therefore, reserve the privilege of adopting all such legitimate changes as may be fairly embodied within the spirit and scope of the invention as claimed.

Having thus fully described my invention, what I desire to claim and secure by Letters Patent is:—

1. The combination with a motor vehicle, of a supplementary axle rotatably mounted in advance of the rear driven axle of the vehicle, traction wheels secured upon the ends of said supplementary axle forwardly extending brace connections between the ends of the axle and the vehicle frame, and a driving connection between each end of the driven axle of the vehicle and the respective traction wheels.

2. The combination with a motor vehicle, of a supplementary axle rotatably mounted in advance of the rear driven axle of the vehicle, a tractor wheel fixed upon each end of the supplementary axle, an internal gear for each tractor wheel, radially disposed bars fixed at their outer ends to the tractor wheel and at their inner ends to the wheel hub and extending across the outer face of the internal gear and fixed thereto, additional brace bars arranged between the periphery of the internal gear and the traction wheel and secured thereto, and a spur gear fixed to each end of the driven axle of the vehicle having meshing engagement with the internal gears on the respective tractor wheels.

3. The combination with a motor driven vehicle, of a supplementary axle rotatably mounted in advance of the driven axle of the vehicle, tractor wheels fixed upon the ends of the supplementary axle, a driving connection between each end of the driven axle and the respective tractor wheels, transversely disposed angle bars fixed to the opposite sides of the machine frame in advance of the tractor wheels, brace rods secured to the ends of the supplementary axle and to said angle bars, and additional brace rods secured to the angle bars and extending forwardly therefrom and having their forward ends fixed to the vehicle frame.

In testimony whereof I hereunto affix my signature in the presence of two witnesses.

ALFRED NOWKA.

Witnesses:
ALBERT BRUNING,
FRED NOWKA, Jr.

Copies of this patent may be obtained for five cents each, by addressing the "Commissioner of Patents, Washington, D. C."